Nov. 3, 1970     W. N. CARSON, JR., ET AL     3,538,396
COULOMETER WITH AT LEAST ONE ELECTRODE CONTAINING
AN EXCESS OF CADMIUM HYDROXIDE
Filed Feb. 24, 1969
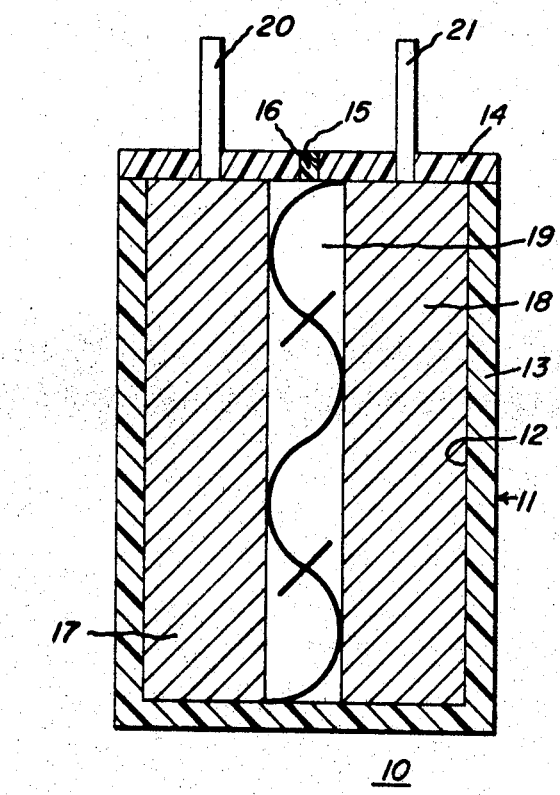
INVENTORS:
WILLIAM N. CARSON, Jr.,
RANDALL N. KING,
by Paul R. Webb, II
THEIR ATTORNEY

United States Patent Office

3,538,396
Patented Nov. 3, 1970

1

3,538,396
COULOMETER WITH AT LEAST ONE ELECTRODE CONTAINING AN EXCESS OF CADMIUM HYDROXIDE
William N. Carson, Jr., Schenectady, and Randall N. King, Johnstown, N.Y., assignors to General Electric Company, a corporation of New York
Filed Feb. 24, 1969, Ser. No. 801,516
Int. Cl. H01g 9/00
U.S. Cl. 317—231                                2 Claims

ABSTRACT OF THE DISCLOSURE

A coulometer has a closed container including an alkaline electrolyte and a pair of spaced apart, reversible electrodes in contact with the electrolyte. Each of the electrodes consists of an inert support, active material on the support, and an electrically conductive lead. One of the electrodes has active material of metallic cadmium in an amount equivalent to the predetermined coulometric capacity of the coulometer, and active material of cadmium hydroxide in an amount of at least 100% of the metallic cadmium. The other electrode has active material in an amount equivalent to the amount of the metallic cadmium and cadmium hydroxide of the first electrode.

---

This invention relates to coulometers and, more particularly, to coulometers employing spaced cadmium electrodes in an alkaline electrolyte.

A coulometer is a device which measures accurately the quantity of electricity which flows through a circuit. In a silver coulometer, the charge to be measured flows through the equivalent of a small silver-plating bath in series in the circuit, and the mass of silver dissolved or deposited is accurately determined. For example, a pair of silver electrodes are immersed in a solution of silver nitrate. The charge that flows in the circuit is readily computed since 1 faraday (96,522 coulombs) deposits 1 equivalent (107.91 grams) of silver.

In U.S. Pat. 3,302,091 issued Jan. 31, 1967, there is described a coulometric device or coulometer in which an electrochemical cell contains two sintered nickel plaque supports impregnated with cadmium and cadmium hydroxide, respectively, which are spaced apart in an alkaline electrolyte, such as potassium hydroxide, contained within the cell. Initially, the active material on both plaques is cadmium oxide or hydroxide. Current is passed through the cell in such a direction to reduce all of the material on one plaque to metallic cadmium and to evolve gaseous oxygen from the other electrode which gas escapes through a cell vent.

This patent sets forth that the reduction of the cadmium hydroxide on one plaque to metallic cadmium results in some oxidation of the other nickel plaque support containing nickel hydroxide. This plaque oxide is removed by shortcircuiting the cell or reversing the current in the cell until the voltage becomes zero. This latter step thereby results in one electrode with substantially all of its active material of cadmium hydroxide and the other electrode in the form of metallic cadmium with 5 to 10% in the form of cadmium hydroxide.

Subsequently, during operation at constant current, an electronic circuit controlled by the voltage across the device is suggested to enable the bypassing of some or, when necessary, virtually all of the available current at the end of its cycle to prevent electrode damage. The coulometer of this patent is indicated to be particularly useful in the charging of secondary batteries.

The present invention is directed to an improved coulometer of the above type with greater stability which eliminates electrode support damage by oxidation during

2 initial and subsequent charging by containing a substantial excess of cadmium hydroxide in each of its electrodes.

It is a primary object of our invention to provide an improved coulometer which provides an electron exchange or charge transfer between an ion and an inert electrode upon current passage thereby eliminating the problems of deposition and dissolution of material and gas evolution.

It is a further object of our invention to provide an improved coulometer which operates as a very acurate, reproducible timing device.

In accordance with one respect of our invention, a coulometer comprises a closed container defining a chamber, an alkaline electrolyte in the chamber, a pair of spaced apart, reversible electrodes positioned in the container and in contact with the electrolyte, an electrically conductive lead in contact with each of the electrodes, and each of the electrodes consisting of an inert support and active material contained thereon. The active materials of one of the electrodes is metallic cadmium in an amount equivalent to the predetermined coulometric capacity of the coulometer, and cadmium hydroxide in an amount of at least 100% of the metallic cadmium, and the active material of the other electrode is cadmium hydroxide in an amount equivalent to the amount of the metallic cadmium and cadmium hydroxide of the first electrode.

These and various other objects, features and advantages of the invention will be better understood from the following description taken in connection with the accompanying drawing in which a coulometer embodying our invention is shown in section in side elevation.

In the single figure of the drawing, there is shown generally at 10 a coulometer embodying our invention. The coulometer comprises a container or vessel 11 defining a chamber 12. The container 11 is preferably made of a non-conductive material such as polymethyl methacrylate or other plastic material. Casing 11 has a body portion 13 and a top portion 14 sealed thereon. A vent 15 is shown sealed by a vent plug 16. A pair of reversible electrodes 17 and 18 are positioned within chamber 12 of container 11 and spaced apart by a chemically inert separator 19 of a material, such as, unwoven nylon. An alkaline electrolyte (not shown) is contained in separator 19 whereby both electrodes 17 and 18 are in contact with the electrolyte. A suitable electrolyte is 31% potassium hydroxide. A pair of electrical leads 20 and 21 are connected to electrodes 17 and 18, respectively. Each of the electrodes consists of an inert support and active material contained on the support. One of the electrodes has active materials of metallic cadmium in an amount equivalent to the predetermined coulometric capacity of the coulometer, and cadmium hydroxide in an amount of at least 100% of the metallic cadmium, while the other electrode has active material of cadmium hydroxide in an amount equivalent to the amounts of the metallic cadmium and cadmium hydroxide of the first electrode.

We discovered unexpectedly that we could form a stable coulometer by employing a large excess of cadmium hydroxide in both of its electrodes. We found that such a coulometer can be formed by a closed container defining a chamber, an alkaline electrolyte in the chamber, a pair of spaced apart, reversible electrodes positioned in the container and in contact with the electrolyte, an electrically conductive lead in contact with each of the electrodes, each of the electrodes consisting of an inert support and active material contained thereon, the active materials of one of the electrodes being metallic cadmium in an amount equivalent to the predetermined coulometric capacity of the coulometer, and cadmium hydroxide in an amount of at least 100% of the metallic cadmium, and the active material of the second electrode being cadmium hydroxide in an amount equivalent to the amount of the metallic cadmium and cadmium hydroxide of the first electrode.

We found that the employment of the excess amount of cadmium hydroxide in both electrodes provided an improved cell wherein the predetermined coulometric capacity required initial and subsequent conversion of a small amount of the available capacity. The improved cell can be easily charged initially without oxidation damage to the electrode support. During subsequent operation, similar oxidation damage is avoided. The addition of the excess amount of cadmium hydroxide did not result in a disadvantage in cell operation.

The electrode support can be in a variety of materials and configurations. We prefer to employ a perforated steel substrate or plaque which is nickel-plated. After a porous nickel sinter is placed on the substrate, the substrate is impregnated with cadmium hydroxide in the conventional manner. Various thicknesses of substrates have been employed from 0.0162 to 0.0343 inch.

Another preferred substrate is a fine nickel mesh onto which is applied a mixture of 18 parts of cadmium oxide and 2 parts of polyethylene encapsulated graphite by pressing at 4000 pounds per square inch at room temperature. A further preferred substrate is a fine nickel mesh onto which is pasted the anode material to form the electrode. For example, an active material was prepared by mixing together 15 percent of a binder of vinylidene fluoride in a dimethyl acetamide solvent and 85 percent cadmium oxide into a paste which was applied to the substrate. The pasted electrode was dried in air at 70° C. for 24 hours to remove the dimethyl acetamide solvent.

In an illustrative operation of the above-described cell shown in the single figure of the drawing, the cell was assembled as described above and shown in the single figure. The active material of both of the electrodes was cadmium hydroxide in an amount 7 to 10 times larger than the required capacity of the cell. The cell was initially charged with the cell vent opened to the atmosphere at a constant current of 10 milliamperes for a period of 4 hours. During this time, oxygen was vented from the cell. The cell was then stored in a closed box with a nitrogen atmosphere for 24 hours to conclude the evoluton of the oxygen from the electrode and prevent addition of oxygen to the cell from the air. The vent was then closed by sealing with any suitable plastic material. After initial charging, one of the electrodes had active materials of metallic cadmium and a large excess of cadmium hydroxide, while the other electrode had active material consisting of cadmium hydroxide.

Subsequently, the cell was operated by a number of cycles of charging and discharging of the electrodes of the cell at a constant current. During the operation of the cell, cadmium is discharged at one electrode as shown in Formula I, while cadmium is charged at the other electrode as shown in Formula II.

(I) $Cd + 2OH^- \rightarrow Cd(OH)_2 + 2e$ (II) $Cd(OH)_2 + 2e \rightarrow Cd + 2OH^-$ During the discharge of the cadmium at one of the electrodes, the voltage across the coulometer was approximately zero as long as free cadmium is left to discharge. Upon exhaustion of the cadmium, the cell voltage rises sharply showing completion of the reaction. The cell operation is then reversed whereupon it follows the above reactions of Formulas I and II until completion of the exhaustion of the cadmium. During the discharge of the charged electrode, the observed cell potential was 30 millivolts or less. At the completion of discharge, the cell potential rose rapidly from between 0.5 to 0.7 volt.

For further protection of the cell, a conventional diode clamping circuit can be employed with the coulometer cell, whereby when the cell voltage exceeds 0.5 volt the diode shunts the current around the coulometer cell.

An example of a coulometer made in accordance with our invention is set forth below:

EXAMPLE 1

A coulometer was assembled generally as shown in the single figure of the drawing wherein each of the electrodes were made of a substrate comprising perforated steel which was nickel plated and subsequently covered with a porous nickel sinter. Cadmium hydroxide was impregnated in each of the substrates in a conventional manner. The cell electrolyte was 31% potassium hydroxide. The cell was charged initially at a constant current of 10 milliamperes for a period of 240 minutes to provide metallic cadmium and an excess of cadmium hydroxide on the substance of one of the electrodes, while the other electrode contained only cadmium hydroxide as the active material. During the initial charging, the cell vent was left open to evolve oxygen. After the initial charging, the cell was placed in a closed box with a nitrogen atmosphere for 24 hours. The vent was then sealed with a conventional plastic.

A constant current flow of 5 milliamperes was supplied to the coulometer. During discharge of the metallic cadmium on one of the electrodes, the cell potential was 30 millivolts. At the completion of this discharge, the cell potential rose rapidly to 0.5 to 0.7 volt. These regular substantial changes in voltage occurred every 480 minutes. The coulometer was cycled 200 times with the same regular substantial changes in voltage.

While other modifications of the invention and variations thereof which may be employed within the scope of the invention have not been described, the invention is intended to include such as may be embraced within the following claims.

What we claim as new and desire to secure by Letters Patent of the United States is:

1. A coulometer comprising a closed container defining a chamber, an alkaline electrolyte in the chamber, a pair of spaced apart, reversible electrodes positioned in the container and in contact with the electrolyte, each of the electrodes consisting of a support inert to the electrolyte and active material contained thereon, the active materials of one of the electrodes being metallic cadmium wherein the amount thereof corresponds to the coulometric capacity of the coulometer, and said one electrode comprising cadmium hydroxide in an amount of at least 100% of the metallic cadmium, and the active material of the second electrode being cadmium hydroxide in an amount equivalent to the amount of the metallic cadmium and cadmium hydroxide of the first electrode.

2. In a coulometer as in claim 1, in which a chemically inert separator is positioned in the container between the electrodes.

References Cited

UNITED STATES PATENTS

| | | | |
|---|---|---|---|
| 2,644,902 | 7/1953 | Hardway | 317—231 X |
| 2,934,580 | 4/1960 | Neumann | 136—24 |
| 3,143,691 | 8/1964 | Hurd | 317—231 |
| 3,302,091 | 1/1967 | Henderson | 320—48 |
| 3,463,673 | 8/1969 | Straup | 320—48 X |

JAMES D. KALLOW, Primary Examine.

U.S. Cl. X.R.

136—182; 317—230